United States Patent
Kano et al.

(10) Patent No.: US 10,700,380 B2
(45) Date of Patent: Jun. 30, 2020

(54) LITHIUM SECONDARY BATTERY INCLUDING ELECTROLYTE CONTAINING CARBORANE ANION

(71) Applicant: Panasonic Intellectual Property Management Co., Ltd., Osaka (JP)

(72) Inventors: Akira Kano, Osaka (JP); Hirotetsu Suzuki, Osaka (JP); Junichi Sakamoto, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 116 days.

(21) Appl. No.: 16/004,439

(22) Filed: Jun. 11, 2018

(65) Prior Publication Data

US 2019/0006714 A1 Jan. 3, 2019

(30) Foreign Application Priority Data

Jun. 28, 2017 (JP) .................................. 2017-126460

(51) Int. Cl.

| | | |
|---|---|---|
| *H01M 10/0567* | (2010.01) | |
| *H01M 10/0568* | (2010.01) | |
| *H01M 10/052* | (2010.01) | |
| *H01M 4/131* | (2010.01) | |
| *H01M 4/134* | (2010.01) | |
| *H01M 4/38* | (2006.01) | |
| *H01M 4/66* | (2006.01) | |

(Continued)

(52) U.S. Cl.
CPC ....... *H01M 10/0568* (2013.01); *H01M 4/131* (2013.01); *H01M 4/134* (2013.01); *H01M 4/382* (2013.01); *H01M 4/661* (2013.01); *H01M 10/052* (2013.01); *H01M 10/0525* (2013.01); *H01M 10/0567* (2013.01); *H01M 10/0569* (2013.01); *H01M 2004/027* (2013.01); *H01M 2300/0037* (2013.01)

(58) Field of Classification Search
CPC ......... H01M 10/0568; H01M 10/0567; H01M 10/052; H01M 10/0569; H01M 10/0525; H01M 4/661; H01M 4/382; H01M 4/134; H01M 4/131; H01M 2300/0037; H01M 2004/027; H01M 10/058
See application file for complete search history.

(56) References Cited

U.S. PATENT DOCUMENTS

| | | |
|---|---|---|
| 4,201,839 A | 5/1980 | Johnson et al. |
| 2007/0054186 A1* | 3/2007 | Costello ............ H01M 10/0568 429/200 |

(Continued)

FOREIGN PATENT DOCUMENTS

| | | |
|---|---|---|
| JP | 55-066873 | 5/1980 |
| JP | 2001-243957 | 9/2001 |

(Continued)

*Primary Examiner* — Cynthia K Walls
(74) *Attorney, Agent, or Firm* — McDermott Will & Emery LLP

(57) ABSTRACT

A lithium secondary battery includes a positive electrode, a negative electrode on which a lithium metal is deposited in a charged state, a separator disposed between the positive electrode and the negative electrode, and a nonaqueous electrolyte containing a nonaqueous solvent and a lithium salt containing a carborane anion.

13 Claims, 2 Drawing Sheets

(51) Int. Cl.
*H01M 10/0525* (2010.01)
*H01M 10/0569* (2010.01)
*H01M 4/02* (2006.01)

(56) References Cited

U.S. PATENT DOCUMENTS

| | | | |
|---|---|---|---|
| 2014/0349178 A1 | 11/2014 | Mohtadi et al. | |
| 2014/0349199 A1 | 11/2014 | Mohtadi et al. | |
| 2015/0214555 A1* | 7/2015 | Visco | H01M 4/5815 |
| | | | 429/347 |
| 2016/0020488 A1* | 1/2016 | Cho | H01M 10/0567 |
| | | | 429/200 |

FOREIGN PATENT DOCUMENTS

| | | |
|---|---|---|
| JP | 2014-524146 | 9/2014 |
| JP | 2014-229620 | 12/2014 |
| WO | 2013/009720 | 1/2013 |

\* cited by examiner

LITHIUM SECONDARY BATTERY INCLUDING ELECTROLYTE CONTAINING CARBORANE ANION

BACKGROUND

1. Technical Field

The present disclosure relates to a lithium secondary battery including a lithium metal as a negative electrode active material.

2. Description of the Related Art

Nonaqueous electrolyte secondary batteries are widely used, for example, for information and communications technology (ICT), such as personal computers and mobile phones, for cars, and for batteries. Nonaqueous electrolyte secondary batteries used for such purposes are required to have further higher capacities. Lithium-ion batteries are known as high-capacity nonaqueous electrolyte secondary batteries. The high capacity of a lithium-ion battery can be achieved by using, for example, a combination of graphite and an alloy active material, such as a silicon compound, as negative electrode active materials. However, the increase in capacity of the lithium-ion battery is reaching the limit.

A lithium secondary battery is potential as a high-capacity nonaqueous electrolyte secondary battery having a capacity higher than that of a lithium-ion battery (for example, Japanese Unexamined Patent Application Publication No. 2001-243957). In the lithium secondary battery, a lithium metal is deposited on the negative electrode during charging, and the lithium metal is dissolved in a nonaqueous electrolyte during discharging.

SUMMARY

In one general aspect, the techniques disclosed here feature a lithium secondary battery including a positive electrode, a negative electrode on which a lithium metal is deposited in a charged state, a separator disposed between the positive electrode and the negative electrode, and a nonaqueous electrolyte containing a nonaqueous solvent and a lithium salt containing a carborane anion.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
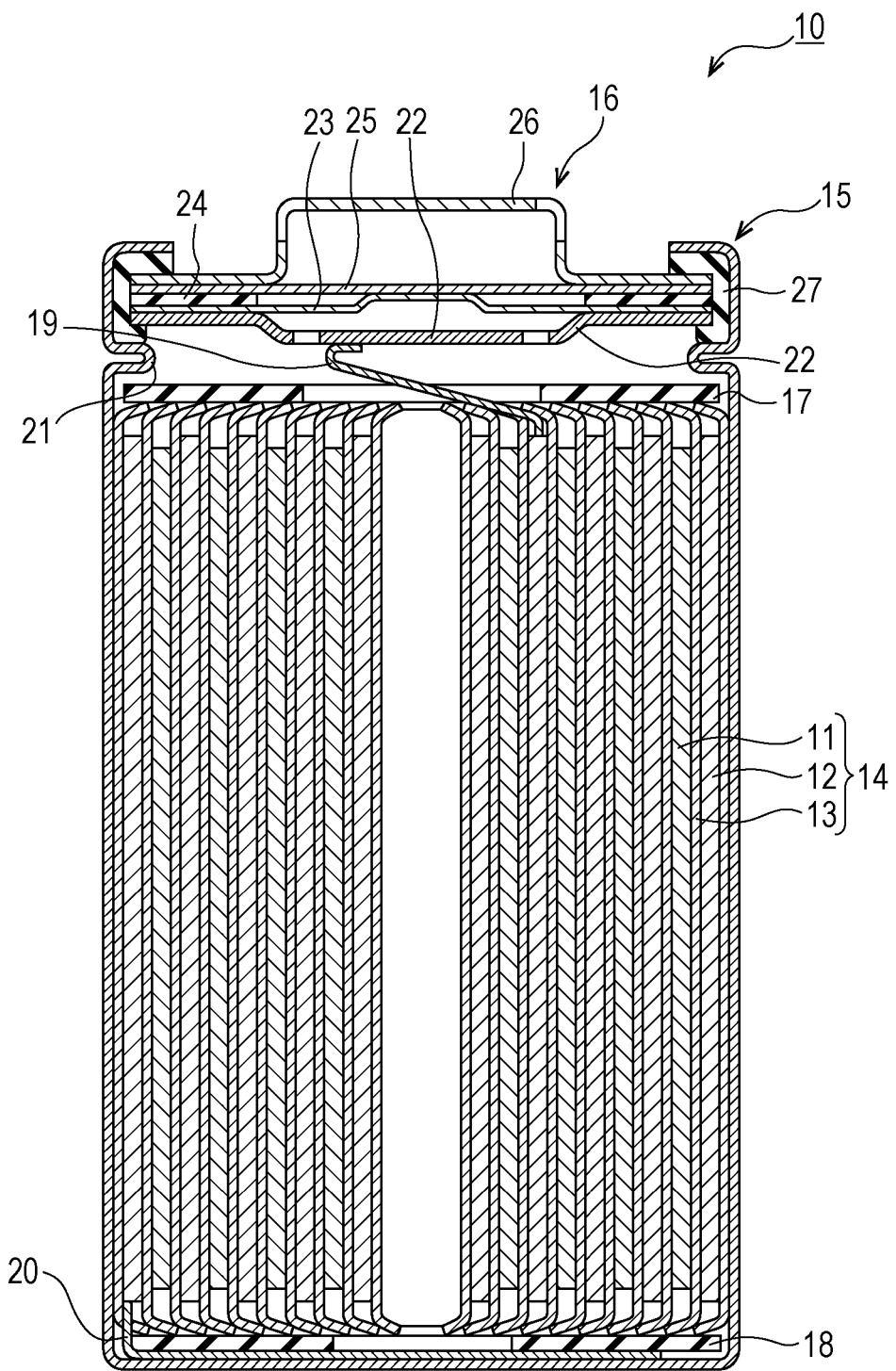
FIG. 1 is a longitudinal cross-sectional view of a lithium secondary battery according to an embodiment of the present disclosure.

Underlying Knowledge Forming Basis of the Present Disclosure

In lithium secondary batteries during charging, a lithium metal may be deposited on the negative electrode in a dendrite form. Furthermore, the specific surface area of the negative electrode increases by the generation of dendrites, which may increase a side reaction. Accordingly, the discharge capacity and cycling characteristics are apt to decrease. Regarding this, Japanese Unexamined Patent Application Publication No. 2001-243957 teaches that the generation of dendrites is suppressed by controlling the ten-point average roughness (Rz) of the negative electrode surface on which the lithium metal is deposited to 10 μm or less. However, in this method, the effect of suppressing generation of dendrites is insufficient.

In addition, in lithium secondary batteries, since a lithium metal is deposited on the negative electrode during charging, the amount of swelling of the negative electrode is particularly apt to increase. When the lithium metal is deposited in a dendrite form, the amount of swelling further increases. In a cylindrical lithium battery including a wound type electrode, the influence of stress generated by excessive swelling of the negative electrode tends to damage the electrode. In square and laminated lithium batteries including sheet-shaped or laminated electrodes, excessive swelling of the negative electrode greatly increases the thickness of the battery itself.

Incidentally, it is known that in charge and discharge of a lithium secondary battery, a film, called a solid electrolyte interphase (SEI) film, is formed on the negative electrode surface from a decomposition product of the nonaqueous electrolyte component. Usually, the thickness of the SEI film is heterogeneous.

Lithium ions diffused in a nonaqueous electrolyte become a lithium metal during charging and is deposited on the surface of the negative electrode. On this occasion, the lithium ions enter the SEI film from a crystal defective portion having low resistance and reach the surface of the negative electrode. Accordingly, the lithium metal tends to heterogeneously deposit on the negative electrode. The heterogeneously deposited lithium metal applies stress locally to the SEI film. In the course of time, the vulnerable thin portion of the SEI film is preferentially destroyed by this stress. The lithium metal is deposited so as to be extruded from the destroyed portion and forms a dendrite. That is, one factor of deposition of the lithium metal in a dendrite form is the heterogeneity in the thickness of the formed SEI film.

The present inventor diligently studied to solve the above-mentioned problems and, as a result, revealed that when a lithium salt in a nonaqueous electrolyte is a carborane compound containing a carborane anion, the SEI film is formed thin and homogeneously. The carborane compound is decomposed at a higher potential of the negative electrode compared to the other substances, such as solvents and additives, contained in the nonaqueous electrolyte. That is, the carborane compound is decomposed prior to other substances during charging. Accordingly, a thin and homogeneous SEI film of the carborane compound is formed on the surface of the negative electrode at the initial stage of charging. In such a case, other substances are prevented from being decomposed during charging, and the SEI film is probably prevented from becoming heterogeneously thick. As a result, the formation of dendrites of the deposited lithium metal is prevented, and a side reaction and swelling of the negative electrode are considerably suppressed. Accordingly, the discharge capacity and the cycling characteristics of the lithium secondary battery are improved regardless of the form of the electrode and the shape of the battery.

EMBODIMENT

An example of the embodiment of a lithium secondary battery according to the present disclosure will now be described.

The lithium secondary battery according to the embodiment includes a positive electrode, a negative electrode facing the positive electrode, a separator intervening between the positive electrode and the negative electrode, and a nonaqueous electrolyte. Each member will now be described in detail.

1. Nonaqueous Electrolyte

The nonaqueous electrolyte includes a first lithium salt. The nonaqueous electrolyte may be in a liquid form or may be in a gel form. A liquid nonaqueous electrolyte includes a first lithium salt and a nonaqueous solvent for dissolving the salt. The nonaqueous electrolyte in a gel form includes, for example, a first lithium salt and a matrix polymer or a first lithium salt, a nonaqueous solvent, and a matrix polymer. The matrix polymer is, for example, a material that absorbs a nonaqueous solvent and gels, and examples thereof include fluororesins, acrylic resins, and polyether resins.

1-1. First Lithium Salt

The first lithium salt is a carborane compound containing a carborane anion.

The carborane anion has a skeleton structure of borane (boron hydride) forming a polyhedron in which a part of boron (B) atoms at apexes of the polyhedron is substituted with a carbon (C) atom. The carborane anion usually includes B, C, and a plurality of hydrogen (H) atoms binding to the B or the C.

The carborane anion may include at least one selected from the group consisting of fluorine (F), chlorine (Cl), and bromine (Br) atoms binding to the B and/or C atom together with a H atom or instead of a H atom. In such a case, the chemical stability of the carborane anion is improved.

Such a carborane anion is represented by, for example, the following formula:

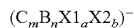

$(C_mB_nX1_aX2_b)^-$ where m and n each independently represent an integer of 1 or more; X1 and X2 each independently represent H, F, Cl, or Br; and a and b each independently represent an integer of 0 or more and satisfy $m+n=a+b \leq 60$. In the formula, $m+n(=a+b)$ is the number of the apexes of the polyhedron constituted by the carborane anion. The number represented by $m+n$ may satisfy, for example, $6 \leq m+n \leq 60$. The integer represented by m may be 1 to 5.

The carborane anion may include a clustering structure. In such a case, the chemical stability of the carborane anion is improved. A cluster is a group of atoms or molecules formed by aggregation of several to several hundreds of the atoms or the molecules. There are various aggregation energy sources on this occasion, and the cluster is formed by means of, for example, a Van der Waals force, an electrostatic interaction, a hydrogen bond, or a covalent bond.

In a carborane anion having a clustering structure, the number represented by $m+n$ may be 12. In such a case, the solubility of the carborane compound in a nonaqueous solvent is improved. In this case, the carborane anion has the skeleton structure of a regular icosahedron. The carborane compound containing such a carborane anion is represented by the following formula (1):

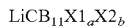

$LiCB_{11}X1_aX2_b$ where, X1 and X2 each independently represent H, F, Cl, or Br; and a and b each independently represent an integer of 0 or more and satisfy $a+b=12$.

In particular, in view of extremely high chemical stability and easy handling, the carborane compound may be $LiCB_{11}H_{12}$, $LiCB_{11}F_{12}$, $LiCB_{11}H_6F_6$, $LiCB_{11}Cl_{12}$, $LiCB_{11}H_6Cl_6$, $LiCB_{11}Br_{12}$, or $LiCB_{11}H_6Br_6$. These carborane compounds are used alone or in combination of two or more thereof.

The amount of the carborane compound is appropriately determined according to, for example, the composition and the type of the nonaqueous solvent included in the nonaqueous electrolyte. For example, the carborane compound may be added to the nonaqueous electrolyte in an amount of 0.01 mol/L or more, or 0.05 mol/L or more. When the amount of the carborane compound is within the above-mentioned range, the homogeneity of the formed SEI film is further improved, and the formation of dendrites is further readily suppressed. The upper limit of the amount of the carborane compound is not particularly limited within a range in which the carborane compound can be dissolved. For example, the amount of $LiCB_{11}H_{12}$ in the nonaqueous electrolyte may be 0.05 to 0.7 mol/L, or 0.1 to 0.5 mol/L.

1-2. Nonaqueous Solvent

Examples of the nonaqueous solvent include esters, ethers, nitriles (such as acetonitrile), and amides (such as dimethylformamide). These solvents are used alone or in combination of two or more thereof. The nonaqueous solvent may be a halogen-substituted product in which at least a part of hydrogen atoms is substituted with a halogen atom, such as fluorine.

Examples of the ester include cyclic carbonates, such as ethylene carbonate (EC), propylene carbonate (PC), butylene carbonate, and fluoroethylene carbonate (FEC); chain carbonates, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates, such as γ-butyrolactone and γ-valerolactone; and chain carboxylates, such as methyl acetate, ethyl acetate, propyl acetate, methyl propionate (MP), ethyl propionate, and methyl fluoropropionate (FMP).

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, dimethoxymethane, 1,1-diethoxyethane, triethylene glycol dimethyl ether, and tetraethylene glycol dimethyl.

The nonaqueous electrolyte may include an additive. The additive may be a compound that is decomposed at a potential lower than that at which a carborane compound is decomposed. The homogeneity of the SEI film is enhanced by further forming a film of the additive on the film of the carborane compound. In such a case, dendrites are further prevented from being generated, and the discharge capacity and the cycling characteristics are further improved. Examples of such an additive include vinylene carbonate (VC), fluoroethylene carbonate (FEC), and vinyl ethyl carbonate (VEC). These additives are used alone or in combination of two or more thereof.

1-3. Second Lithium Salt

The carborane compound forms an SEI film and is therefore apt to be consumed. Accordingly, in order to maintain the concentration of the electrolyte in the nonaqueous electrolyte, the nonaqueous electrolyte may include a lithium salt (second lithium salt), in addition to the carborane compound. The second lithium salt may be a compound that is decomposed when the potential of the negative electrode is lower than the potential at which the carborane compound is decomposed. The amount of the second lithium salt in the nonaqueous electrolyte is not particularly limited and may be 0.1 to 2.0 mol/L, or 0.5 to 1.5 mol/L.

Examples of the second lithium salt include $LiBF_4$, $LiClO_4$, $LiPF_6$ (lithium hexafluorophosphate), $LiAsF_6$, $LiSbF_6$, $LiAlCl_4$, LiSCN, $LiCF_3SO_3$, $LiCF_3CO_2$, imide salts such as $LiN(C_mF_{2m+1}SO_2)_x(C_nF_{2n+1}SO_2)_y$ (m and n each independently represent an integer of 0 or more; and x and y each independently represent 0, 1, or 2 and satisfy x+y=2), and lithium salts containing oxalate complexes as anions. In particular, in view of further preventing generation of dendrites, the second lithium salt may be $LiPF_6$, $LiN(SO_2CF_3)_2$ (lithium bis(trifluoromethylsulfonyl)imide), $LiN(SO_2C_2F_5)_2$ (lithium bis(perfluoroethylsulfonyl)imide), $LiN(SO_2F)_2$, or a lithium salt containing an anion of an oxalate complex. These salts are used alone or in combination of two or more thereof.

The lithium salt containing an oxalate complex as an anion may contain boron (B) or phosphorus (P). Examples of such a lithium salt include lithium bis(oxalate)borate (LiBOB), $LiBF_2(C_2O_4)$, $LiPF_4(C_2O_4)$, and $LiPF_2(C_2O_4)_2$. The lithium salt containing an oxalate complex as an anion may be LiBOB or $LiBF_2(C_2O_4)$.

2. Negative Electrode

The negative electrode is an electrode on which a lithium metal is deposited in a charged state. The lithium metal is mainly deposited on the surface of the negative electrode facing the positive electrode. The deposited lithium metal is derived from the lithium ions in the nonaqueous electrolyte and is dissolved in the nonaqueous electrolyte again by charging.

The negative electrode is composed of, for example, metal lithium and/or a lithium alloy. Alternatively, the negative electrode may include a negative electrode current collector constituted of a conductive material other than metal lithium and/or a lithium alloy. In such a case, a negative electrode active material layer containing a lithium metal may be formed on at least the surface of the negative electrode current collector facing the positive electrode. The negative electrode active material layer is formed by, for example, pasting a lithium metal in a foil form or electrodeposition or vapor deposition of a lithium metal.

However, in the fully discharged state of a battery, the negative electrode need not include a substantially dischargeable lithium metal. That is because the volume energy density of the battery is increased. That is, the negative electrode includes a negative electrode current collector as described above but need not include a negative electrode active material layer in the fully discharged state. In such a case, the negative electrode after the discharge of the battery is constituted of only the negative electrode current collector, and by charging, a lithium metal is deposited on the surface of the negative electrode current collector to form a negative electrode active material layer (lithium metal layer).

The fully discharged state of a battery is a state in which the lithium secondary battery is discharged to the lowest voltage within a predetermined voltage range in the equipment field using the lithium secondary battery. The fact that the negative electrode does not include a substantially dischargeable lithium metal in the fully discharged state can be examined as follows. For example, the negative electrode is taken out from a lithium secondary battery disassembled in the fully discharged state and is washed with a nonaqueous solvent, such as an ester, and dried. A test battery including the resulting negative electrode and a counter electrode of a lithium metal is produced. If the negative electrode cannot discharge, the negative electrode can be judged to be in a fully discharged state.

2-1. Negative Electrode Current Collector

The negative electrode current collector is constituted of a conductive material other than metal lithium and/or a lithium alloy. In particular, the negative electrode current collector may be constituted of a metal material that does not react with a lithium metal (does not form an alloy or intermetallic compound with a lithium metal). Examples of such a metal material include copper (Cu), nickel (Ni), iron (Fe), and stainless steel (SUS). The metal material may be Cu from the viewpoint of conductivity.

Examples of the form of the negative electrode current collector include a porous or nonporous sheet (such as a foil or film). When the negative electrode current collector is a copper foil, the copper foil may be mainly made of Cu (Cu occupying for 50% by mass or more of the copper foil) or may be constituted of substantially only Cu. The negative electrode current collector may have any thickness, such as 5 to 20 μm.

2-2. Protective Layer

The negative electrode may include a protective layer at least on the surface facing the positive electrode. The protective layer may be of an organic material or may be of an inorganic material. The protective layer may be of, for example, a solid electrolyte. In such a case, the reaction on the negative electrode surface tends to be homogeneous, and dendrites are further prevented to be generated.

Examples of the solid electrolyte include sulfide solid electrolytes, phosphate solid electrolytes, perovskite solid electrolyte, and garnet solid electrolytes.

The sulfide solid electrolyte contains a sulfur component and has lithium ion conductivity. The sulfide solid electrolyte is a compound containing, for example, lithium (Li), sulfur (S), and a third component (A). Examples of the third component A include P, germanium (Ge), B, silicon (Si), iodine (I), aluminum (Al), gallium (Ga), and arsenic (As). These sulfide solid electrolytes are used alone or in combination of two or more thereof. Examples of the sulfide solid electrolyte include $Li_2S$—$P_2S_5$ ($Li_2S$: 50% by mol, $P_2S_5$: 50% by mol), $70Li_2S$-$30P_2S_5$ ($Li_2S$: 70% by mol, $P_2S_5$: 30% by mol), 80Li$_2$S-20P$_2$S$_5$ (Li$_2$S: 80% by mol, P$_2$S$_5$: 20% by mol), Li$_2$S—SiS$_2$ (Li$_2$S: 50% by mol, SiS$_2$: 50% by mol), and LiGe$_{0.25}$P$_{0.75}$S$_4$.

The phosphate solid electrolyte contains a phosphate component and has lithium ion conductivity. Examples of the phosphate solid electrolyte include phosphate compounds containing lithium, such as Li$_{1+X}$Al$_X$Ti$_{2-X}$(PO$_4$)$_3$ (where, 0<X<2) and Li$_{1+Y}$Al$_Y$Ge$_{2-Y}$(PO$_4$)$_3$ (where, 0<Y<2). X and Y may satisfy 0<X≤1 and 0<Y≤1, respectively. More specifically, Li$_{1.5}$Al$_{0.5}$Ti$_{1.5}$(PO$_4$)$_3$ is exemplified.

The garnet solid electrolyte is a compound having a garnet crystal structure and is generally represented by a compositional formula A$_3$B$_2$C$_3$O$_{12}$. The garnet solid electrolyte is, for example, a complex oxide containing Li, lanthanum (La), and zirconium (Zr), such as lithium lanthanum zirconate. Specifically, Li$_7$La$_3$Zr$_2$O$_{12}$ is exemplified.

The perovskite solid electrolyte is a compound having a perovskite crystal structure and is generally represented by a compositional formula ABO$_3$. The perovskite solid electrolyte is, for example, a complex oxide containing Li, La, and titanium (Ti), such as lithium lanthanum titanate. Specifically, (LaLi)TiO$_3$ and La$_{1-3x}$Li$_{3x}$TiO$_3$ are exemplified.

The organic material is, for example, a lithium conductive polymer, such as polyethylene oxide and poly(methyl methacrylate). The inorganic material is, for example, a ceramic material, such as SiO$_2$, Al$_2$O$_3$, and magnesium oxide (MgO).

The protective layer may include a garnet solid electrolyte (particularly, Li$_7$La$_3$Zr$_2$O$_{12}$) and may include a phosphate solid electrolyte (particularly, a phosphate compound containing lithium).

3. Positive Electrode

The positive electrode includes, for example, a positive electrode current collector and a positive electrode mixture layer formed on the positive electrode current collector. The positive electrode mixture layer may be formed each surface of the positive electrode current collector. The positive electrode is prepared by, for example, applying a positive electrode mixture slurry onto both surfaces of a positive electrode current collector and drying and then rolling the coating film.

3-1. Positive Electrode Mixture Layer

The positive electrode mixture layer includes, for example, a positive electrode active material, a conductive material, and a binder.

The positive electrode active material is a material that occludes and releases lithium ions. Examples of the positive electrode active material include lithium-containing transition metal oxides, transition metal fluorides, polyanions, fluorinated polyanions, and transition metal sulfides. The positive electrode active material may be a lithium-containing transition metal oxide in view of a low manufacturing cost and a high average discharge voltage.

Examples of the metal element constituting the lithium-containing transition metal oxide include Mg, Al, calcium (Ca), scandium (Sc), Ti, vanadium (V), chromium (Cr), manganese (Mn), Fe, cobalt (Co), Ni, Cu, zinc (Zn), Ga, Ge, yttrium (Y), Zr, tin (Sn), antimony (Sb), tungsten (W), lead (Pb), and bismuth (Bi). The metal element may be Co, Ni, Mn, or Al. These metal elements are used alone or in combination of two or more thereof.

For example, a coating layer coating the surface of the positive electrode active material may be provided. The coating layer can prevent a side reaction between the positive electrode active material and the electrolyte.

Examples of the material of the coating layer include oxides, fluorides, and solid electrolytes. Examples of the metal element constituting the oxide or fluoride include titanium, aluminum, zirconium, vanadium, molybdenum, cerium, lanthanum, tungsten, and silicon. Examples of the solid electrolyte include organic polymer solid electrolytes, oxide solid electrolytes, and sulfide solid electrolytes. The organic polymer solid electrolyte may be a compound composed of a high-molecular compound and a lithium salt. The high-molecular compound may have, for example, an ethylene oxide structure. In such a case, the solid electrolyte can contain a large amount of a lithium salt, and the ionic conductivity of the solid electrolyte is enhanced. Examples of the oxide solid electrolyte include NASICON-type solid electrolytes represented by LiTi$_2$(PO$_4$)$_3$ and elemental substitution products thereof, (LaLi)TiO$_3$-based perovskite solid electrolytes, LISICON-type solid electrolytes represented by Li$_{14}$ZnGe$_4$O$_{16}$, Li$_4$SiO$_4$, LiGeO$_4$, and elemental substitution products thereof, garnet solid electrolytes represented by Li$_7$La$_3$Zr$_2$O$_{12}$ and elemental substitution products thereof, Li$_3$N and H substitution products thereof, and Li$_3$PO$_4$ and N substitution products thereof. Examples of the sulfide solid electrolyte include Li$_2$S—P$_2$S$_5$, Li$_2$S—SiS$_2$, Li$_2$S—B$_2$S$_3$, Li$_2$S—GeS$_2$, Li$_{3.25}$Ge$_{0.25}$P$_{0.75}$S$_4$, and Li$_{10}$GeP$_2$S$_{12}$. Furthermore, to these sulfide solid electrolytes, LiX (where, X represents F, Cl, Br, or I) or MO$_p$ or Li$_q$MO$_p$ (where, M represents P, Si, Ge, B, Al, Ga, or In; and p and q represents integers) may be added.

Examples of the conductive material include carbon materials, such as carbon black (CB), acetylene black (AB), Ketchen black, carbon nanotubes (CNT), and graphite. Examples of the binder include fluororesins, such as polytetrafluoroethylene (PTFE) and polyfluorinated vinylidene (PVdF); polyacrylonitrile (PAN); polyimide resins; acrylic resins; and polyolefin resins. These binders are used alone or in combination of two or more thereof.

3-2. Positive Electrode Current Collector

Examples of the material of the positive electrode current collector include metal materials, such as Al, SUS, Ti, and alloys thereof. The material may be Al or an Al alloy in view of being inexpensive and being readily formed into a thin film. Examples of the form of the positive electrode current collector include a porous or nonporous sheet. A metal material sheet is, for example, a metal foil (metal film) or metal mesh. Furthermore, a carbon material, such as carbon, may be applied to the surface of the positive electrode current collector. In such a case, it is possible to expect, for example, a decrease in resistance value, provision of a catalytic effect, and strengthening of the bond between the positive electrode mixture layer and the positive electrode current collector.

4. Separator

As the separator, a porous sheet having ionic permeability and insulation is used. Examples of the porous sheet include thin film, woven fabric, and nonwoven fabric having micropores. Although the material of the separator is not particularly limited, in particular, the material may be, for example, an olefin resin, such as polyethylene, polypropylene, and a copolymer of ethylene and propylene, or cellulose. The separator may be a layered product of porous sheets. For example, the separator may be a layered product of a nonwoven fabric formed of cellulose fibers and a nonwoven fabric formed of thermoplastic resin fibers or may be a layered product of a polyethylene thin film and a polypropylene thin film. A polyamide resin may be applied to the surface of the separator. In such a case, an improvement in the durability of the separator can be expected. In addition, a heat resistant layer containing an inorganic filler may be formed at the interface between the separator and the positive electrode and/or the interface between the separator and the negative electrode.

5. Lithium Secondary Battery

Figure 2:
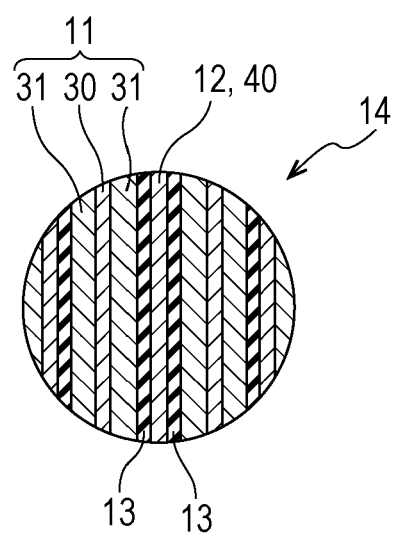
FIG. 2 is a cross-sectional view illustrating the structure of an electrode body according to an embodiment of the present disclosure.

A structure of the lithium secondary battery according to the present disclosure will now be described with reference to the drawings. FIG. 1 is a longitudinal cross-sectional view of a lithium secondary battery 10 that is an example of the embodiment. FIG. 2 is a cross-sectional view illustrating the structure of an electrode body 14 that is an example of the embodiment. In the lithium secondary battery 10, a lithium metal is deposited on a negative electrode 12 during charging, and the lithium metal is dissolved in a nonaqueous electrolyte (not shown) during discharging.

The lithium secondary battery 10 is a cylindrical battery including a cylindrical metal battery case. However, the shape of the lithium secondary battery of the present disclosure is not limited to this and can be appropriately selected according to the purpose. For example, the lithium secondary battery may be a coin battery, a square battery including a square metal case, or a laminate battery including an exterior body formed of, for example, a laminate sheet including an Al layer.

The battery case is composed of a case body 15 and a sealed body 16. The battery case accommodates the electrode body 14 and the nonaqueous electrolyte. A gasket 27 is disposed between the case body 15 and the sealed body 16, and the sealability of the battery case is secured.

The case body 15 is a metal container having bottomed cylindrical shape. The case body 15 has, for example, a stepped portion 21 formed by pressing the side wall from the outside. The stepped portion 21 may be annularly formed along the circumferential direction of the case body 15. In such a case, the sealed body 16 is supported by the upper surface of the stepped portion 21.

The sealed body 16 is formed by stacking a filter 22, a lower valve 23, an insulating member 24, an upper valve 25, and a cap 26 in this order from the inside of the battery case. Each of these members has, for example, a disk shape or a ring shape. The lower valve 23 and the upper valve 25 are connected to each other at the central portions thereof, and the insulating member 24 lies between the lower valve 23 and the upper valve 25 at the peripheries thereof. The filter 22 and the lower valve 23 are connected to each other at the central portions thereof. The upper valve 25 and the cap 26 are connected to each other at the central portions thereof. That is, the members excluding the insulating member 24 are electrically connected to one another.

The lower valve 23 may be provided with a vent hole (not shown). Accordingly, if the internal pressure of the battery case is increased due to, for example, abnormal heat generation, the upper valve 25 swells toward the cap 26 side and separates from the lower valve 23. In such a case, the electrical connection between the lower valve 23 and the upper valve 25 is shut down. If the internal pressure is further increased, the upper valve 25 is broken, and the gas is discharged from an opening (not shown) formed in the cap 26.

The electrode body 14 includes a positive electrode 11, a negative electrode 12, and a separator 13. The positive electrode 11 and the negative electrode 12 are spirally wound with the separator 13 therebetween. However, the shape of the electrode body is not limited. The electrode body may include, for example, disk-shaped positive electrode and negative electrode or may be of a laminated type in which a plurality of positive electrodes and a plurality of negative electrodes are alternately laminated with separators therebetween. The disk-shaped positive electrode and negative electrode can be applied to a coin battery.

The positive electrode 11, the negative electrode 12, and the separator 13 constituting the electrode body 14 are all formed into band shapes. In the electrode body 14, the positive electrode 11 and the negative electrode 12 are alternately laminated in the radial direction of the electrode body 14. That is, the longitudinal direction of each electrode is the winding direction, and the width direction of each electrode is in the axial direction. Insulating plates 17, 18 are respectively disposed at both ends of the electrode body 14 in the axial direction.

The positive electrode 11 includes a positive electrode current collector 30 and positive electrode mixture layers 31 (see FIG. 2) and is electrically connected to a positive electrode terminal (cap 26) via a positive electrode lead 19. One end of the positive electrode lead 19 is connected to, for example, the vicinity of the center of the positive electrode 11 in the longitudinal direction. The positive electrode lead 19 extending from the positive electrode 11 passes through a through hole (not shown) formed in the insulating plate 17 and reaches the filter 22. The other end of the positive electrode lead 19 is welded to the surface of the filter 22 on the electrode body 14 side.

The negative electrode 12 includes a negative electrode current collector 40 (see FIG. 2) and is electrically connected to a negative electrode terminal (case body 15) via a negative electrode lead 20. One end of the negative electrode lead 20 is connected to, for example, an end of the negative electrode 12 in the longitudinal direction, and the other end is welded to the inner surface of the bottom of the case body 15.

6. Experimental Results

The present disclosure will now be described in more detail based on Examples, but the present disclosure is not limited to the following Examples.

6-1. Example 1

(1) Production of Positive Electrode

Lithium-containing transition metal oxide (NCA: positive electrode active material) containing Li, Ni, Co, and Al; acetylene black (AB: conductive material); and polyfluorinated vinylidene (PVdF: binder) were mixed at a mass ratio of NCA:AB:PVdF=95:2.5:2.5. An appropriate amount of N-methyl-2-pyrrolidone (NMP) was further added thereto, and the mixture was stirred to prepare a positive electrode mixture slurry. Subsequently, the resulting positive electrode mixture slurry was applied onto both surfaces of an aluminum foil (positive electrode current collector) and was then dried. The coating film of the positive electrode mixture was rolled with a roller. Finally, the resulting layered product of the positive electrode current collector and the positive electrode mixture was cut into a predetermined electrode size to produce a positive electrode provided with positive electrode mixture layers on both surfaces of the positive electrode current collector.

(2) Production of Negative Electrode

An electrolytic copper foil (thickness: 10 µm) was cut into a predetermined electrode size to prepare a negative electrode.

(3) Preparation of Nonaqueous Electrolyte

Ethylene carbonate (EC) and dimethyl carbonate (DMC) were mixed at a volume ratio of EC:DMC=3:7. $LiCB_{11}H_{12}$ and $LiPF_6$ were dissolved in the resulting solvent mixture at concentrations of 0.1 mol/L and 1 mol/L, respectively, to prepare a nonaqueous electrolyte liquid.

(4) Production of Battery

A tab made of Al was attached to the positive electrode prepared above. A tab made of Ni was attached to the negative electrode prepared above. The positive electrode and the negative electrode were spirally wound with a polyethylene thin film (separator) therebetween in an inert gas atmosphere to produce a wound type electrode body. The resulting electrode body was accommodated in a bag-shaped exterior body made of a laminate sheet including an Al layer, and the nonaqueous electrolyte was poured thereinto. The exterior body was then sealed to produce a lithium secondary battery T1.

6-2. Example 2

A lithium secondary battery T2 was produced as in Example 1 except that the amount of $LiCB_{11}H_{12}$ in "(3) Preparation of nonaqueous electrolyte" was 0.5 mol/L.

6-3. Example 3

A lithium secondary battery T3 was produced as in Example 2 except that $LiPF_6$ was not added in "(3) Preparation of nonaqueous electrolyte".

6-4. Comparative Example 1

A lithium secondary battery R1 was produced as in Example 1 except that $LiCB_{11}H_{12}$ was not added in "(3) Preparation of nonaqueous electrolyte".

6-5. Comparative Example 2

A graphite powder (C), a silicon (Si) powder, and PVdF (binder) were mixed at a mass ratio of C:Si:PVdF=80:15:5. An appropriate amount of NMP was further added thereto, and the mixture was stirred to prepare a negative electrode mixture slurry. Subsequently, the resulting negative electrode mixture slurry was applied onto both surfaces of an electrolytic copper foil (negative electrode current collector) and was then dried. The coating film of the negative electrode mixture was rolled with a roller. Finally, the resulting layered product of the negative electrode current collector and the negative electrode mixture was cut into a predetermined electrode size to produce a negative electrode provided with negative electrode mixture layers on both surfaces of the negative electrode current collector.

A lithium ion secondary battery R2 was produced as in Example 2 except that this negative electrode was used.

6-6. Comparative Example 3

A lithium ion secondary battery R3 was produced as in Comparative Example 2 except that $LiCB_{11}H_{12}$ was not added in "(3) Preparation of nonaqueous electrolyte".

6-7. Evaluation 1

The resulting batteries T1 to T3 and R1 to R3 were subjected to a charge and discharge test to evaluate the charge and discharge characteristics.

In the charge and discharge test, each battery was charged in a thermostat of 25° C. by the following conditions, was then paused for 20 minutes, and was then discharged by the following conditions.

Charging: Charging at a constant current of 10 mA was performed up to a battery voltage of 4.3 V, and charging at a constant voltage of 4.3 V was then performed up to a current value of 1 mA.

Discharging: Discharging at a constant current of 10 mA was performed down to a battery voltage of 2.5 V.

The above charging and discharging was defined as one cycle, and 20 cycles were carried out in the charge and discharge test. The value obtained by dividing the discharge capacity at the 20th cycle by the discharge capacity at the 1st cycle was defined as a capacity retention rate (%). The results of the evaluation are shown in Table 1.

TABLE 1

| | $LiCB_{11}H_{12}$ molar concentration (mol/L) | $LiPF_6$ molar concentration (mol/L) | Negative electrode active material | Initial discharge capacity (mAh) | Capacity retention rate (%) |
|---|---|---|---|---|---|
| T1 | 0.1 | 1 | Li metal | 55 | 36 |
| T2 | 0.5 | 1 | Li metal | 53 | 42 |
| T3 | 0.5 | — | Li metal | 50 | 29 |
| R1 | — | 1 | Li metal | 39 | 5 |
| R2 | 0.5 | 1 | C/Si | 30 | 22 |
| R3 | — | 1 | C/Si | 30 | 20 |

As shown in Table 1, the batteries T1 to T3 all had initial discharge capacities larger than that of the battery R1 and also had excellent cycling characteristics. This is assumed that the use of a carborane compound as a lithium salt prevented generation of dendrites of a lithium metal during charging.

In the lithium ion secondary battery R2 using graphite and silicon as the negative electrode active materials, the initial discharge capacity was not improved compared to the lithium ion secondary battery R3. That is, it is demonstrated that the increase in the initial discharge capacity by addition of a carborane compound is specific to the lithium secondary battery using a lithium metal as the active material.

6-8. Example 4

A lithium secondary battery T4 was produced as in Example 1 except that $LiCB_6H_6Br_6$ was used instead of $LiCB_{11}H_{12}$ in "(3) Preparation of nonaqueous electrolyte".

6-9. Example 5

A lithium secondary battery T5 was produced as in Example 1 except that $LiCB_6H_6Cl_6$ was used instead of $LiCB_{11}H_{12}$ in "(3) Preparation of nonaqueous electrolyte".

6-10. Example 6

A lithium secondary battery T6 was produced as in Example 1 except that $LiCB_{11}Cl_{12}$ was used instead of $LiCB_{11}H_{12}$ in "(3) Preparation of nonaqueous electrolyte".

6-11. Example 7

A lithium secondary battery T7 was produced as in Example 1 except that $LiCB_{11}H_6F_6$ was used instead of $LiCB_{11}H_{12}$ in "(3) Preparation of nonaqueous electrolyte".

6-12. Evaluation 2

The resulting batteries T4 to T7 were evaluated for the charge and discharge characteristics as in "6-7. Evaluation 1". The results of the evaluation are shown in Table 2 together with the results for the batteries T1 and R1.

TABLE 2

| | Lithium boron compound | | LiPF$_6$ molar concentration (mol/L) | Negative electrode active material | Initial discharge capacity (mAh) | Capacity retention rate (%) |
|---|---|---|---|---|---|---|
| | Composition | molar concentration (mol/L) | | | | |
| T1 | $LiCB_{11}H_{12}$ | 0.1 | 1 | Li metal | 55 | 36 |
| T4 | $LiCB_{11}H_6Br_6$ | 0.1 | 1 | Li metal | 59 | 33 |
| T5 | $LiCB_{11}H_6Cl_6$ | 0.1 | 1 | Li metal | 56 | 33 |
| T6 | $LiCB_{11}Cl_{12}$ | 0.1 | 1 | Li metal | 60 | 37 |
| T7 | $LiCB_{11}H_6F_6$ | 0.1 | 1 | Li metal | 62 | 44 |
| R1 | — | — | 1 | Li metal | 39 | 5 |

As shown in Table 2, the batteries T4 to T7 all had initial discharge capacities larger than that of the battery R1 and also had excellent cycling characteristics. In particular, the battery T7 including a fluorine-containing carborane compound had an especially high capacity retention rate. This is assumed that the fluorine-containing carborane compound stabilizes the structure to suppress a side reaction with charging and discharging.

The results shown in Table 2 revealed that the batteries T4, T5, and T7 using a compound in which a part of the H atoms in $LiCB_{11}H_{12}$ was substituted with a halogen and the battery T6 using a compound in which all the H atoms were substituted with a halogen had excellent discharge capacities and capacity retention rates compared to the battery R1. It was also revealed that these effects are independent of the type of the halogen.

The lithium secondary battery of the present disclosure has a high discharge capacity and excellent cycling characteristics and therefore can be used in, for example, electronic devices, such as mobile phones, smart phones, and tablet terminals; electric vehicles including hybrid and plug-in hybrid vehicles; and household storage batteries combined with solar batteries.

What is claimed is:

1. A lithium secondary battery comprising:
   a positive electrode;
   a negative electrode on which a lithium metal is deposited in a charged state;
   a separator disposed between the positive electrode and the negative electrode; and
   a nonaqueous electrolyte containing a nonaqueous solvent and a lithium salt containing a carborane anion, wherein
   the carborane anion contains at least one selected from the group consisting of hydrogen, fluorine, chlorine, and bromine, and
   the lithium salt is represented by a formula $LiCB_{11}X1_aX2_b$,
   where X1 and X2 each independently represent H, F, Cl, or Br, a and b each independently are an integer of 0 or more and satisfy a+b=12.

2. The lithium secondary battery according to claim 1, wherein
   the carborane anion has a clustering structure.

3. The lithium secondary battery according to claim 1, wherein
   the lithium salt is at least one selected from the group consisting of $LiCB_{11}H_{12}$, $LiCB_{11}F_{12}$, $LiCB_{11}H_6F_6$, $LiCB_{11}Cl_{12}$, $LiCB_{11}H_6Cl_6$, $LiCB_{11}Br_{12}$, and $LiCB_{11}H_6Br_6$.

4. The lithium secondary battery according to claim 1, wherein
   a concentration of the lithium salt in the nonaqueous electrolyte is 0.01 mol/L or more and 0.05 mol/L or less.

5. The lithium secondary battery according to claim 1, wherein
   the negative electrode in a fully discharged state is composed of only a negative electrode current collector not containing a lithium metal.

6. The lithium secondary battery according to claim 5, wherein
   the negative electrode current collector includes a copper foil.

7. The lithium secondary battery according to claim 1, wherein
   the nonaqueous electrolyte further contains at least one selected from the group consisting of $LiPF_6$, $LiN(SO_2CF_3)_2$, $LiN(SO_2C_2F_5)_2$, $LiN(SO_2F)_2$, and lithium salts containing oxalate complexes as anions.

8. The lithium secondary battery according to claim 1, wherein
   the nonaqueous electrolyte further contains at least one selected from the group consisting of ethylene carbonate, vinylene carbonate, fluoroethylene carbonate, and vinyl ethylene carbonate.

9. The lithium secondary battery according to claim 1, further comprising:
   a protective layer covering a surface of the negative electrode facing the positive electrode.

10. The lithium secondary battery according to claim 9, wherein
    the protective layer includes a solid electrolyte.

11. The lithium secondary battery according to claim 1, wherein
the positive electrode includes a positive electrode active material and a coating layer coating a surface of the positive electrode active material.

12. The lithium secondary battery according to claim 11, wherein
the coating layer includes at least one selected from the group consisting of oxides, fluorides, and solid electrolytes.

13. The lithium secondary battery according to claim 1, wherein
a concentration of the lithium salt in the nonaqueous electrolyte is 0.01 mol/L or more and 0.7 mol/L or less.

* * * * *